United States Patent [19]
Eichhorn

[11] 3,861,036
[45] Jan. 21, 1975

[54] BOILED EGG SHELL PEELER

[76] Inventor: Dorothea F. Eichhorn, 153 Castle Cres., Oakville, Ontario, Canada

[22] Filed: Oct. 11, 1973

[21] Appl. No.: 405,577

[30] Foreign Application Priority Data
May 2, 1973   Canada.................................. 170270

[52] U.S. Cl............... 30/120.1, 30/123.6, 30/123.7, 81/43
[51] Int. Cl......................... B26b 27/00, B25b 9/02
[58] Field of Search............ 30/120.1, 120.5, 123 R, 30/123.5, 123.6, 123.7; 7/1 P; 81/43

[56] References Cited
UNITED STATES PATENTS

| | | | |
|---|---|---|---|
| 206,707 | 8/1878 | Doane | 30/123.5 |
| 557,188 | 3/1896 | Capewell | 30/123.6 |
| 559,961 | 5/1896 | Barr | 30/123.7 |
| 687,820 | 12/1901 | Crandall | 30/123.6 |
| 1,326,373 | 12/1919 | Rice | 30/114 UX |
| 1,452,930 | 4/1923 | Polk | 30/123.5 |
| 1,644,119 | 10/1927 | Fowler | 30/120.1 |
| 2,331,604 | 10/1943 | Gamache et al. | 81/43 |
| 2,506,073 | 5/1950 | Duzmal | 30/120.1 |
| 3,152,627 | 10/1964 | Poljanic | 30/120.1 |
| 3,237,299 | 3/1966 | Gibbs | 30/123.7 |

FOREIGN PATENTS OR APPLICATIONS

| | | | |
|---|---|---|---|
| 192,977 | 2/1923 | Great Britain | 30/123.6 |
| 535,708 | 4/1941 | Great Britain | 30/123.7 |
| 675,632 | 5/1939 | Germany | 81/43 |

*Primary Examiner*—Al Lawrence Smith
*Assistant Examiner*—J. T. Zatarga

[57] ABSTRACT

This invention is a manually operable device that facilitates the removal of the shell from a boiled egg. It is comprised of a curved section contoured to the shape of an egg, a handle, and attached to the upper side of the handle is a tweezer arrangement. The front edge of the curved section is bevelled. By movement of the curved section between the shell and the outer surface of the edible portion in a skimming manner the egg shell can be easily loosened and removed. The tweezer arrangement is used to grip the loosened shell sections and to dispose of them thereby eliminating the need for finger contact.

3 Claims, 2 Drawing Figures

BOILED EGG SHELL PEELER

This invention relates to a manually operable device for removing the shell of a boiled egg. To my knowledge there are no patented or existing marketable devices of this nature to aid in the above function. The usual manner or removing the shell of a boiled egg consists of manually cracking the shell and then removing the shell fragments with one's fingers. This procedure can be both time consuming and painful to the fingers.

I have found that with my invention, which consists of a specially shaped mechanical device, the time required to remove the egg shell is greatly reduced and that the contact of the shell fragments with fingers is practically eliminated.

Figure 1:
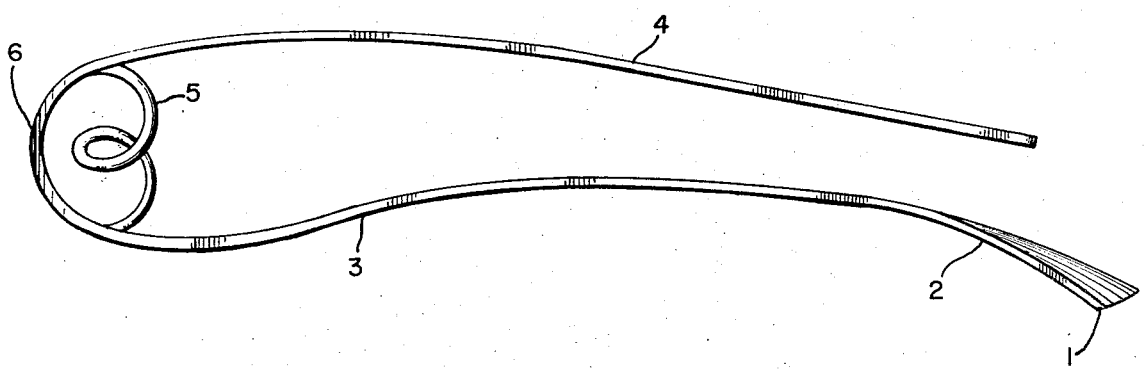
Figure 2:
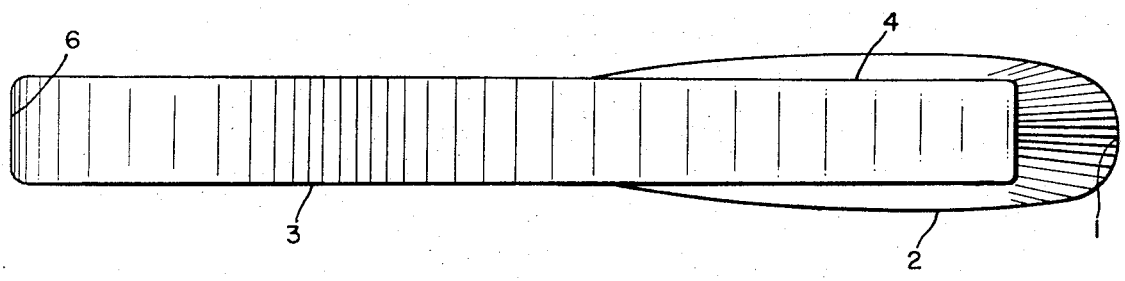

The following drawings illustrate embodiments of the invention;

FIG. 1 is a side view of the device.
FIG. 2 is a top plan view of the device.

The device illustrated comprises a tongs-like hand tool with an upper blade 4 and lower blade 3 having a curved end portion 2 contoured to the shape of an egg, with a concave, part-spherical undersurface the front edge 1 of the curved end portion being bevelled to provide some cutting action. By means of the bevelled edge 1 and the specially contoured shape, it is possible to slip the curved end portion 2 of the device between the shell and the outer surface of the edible portion of the egg. The axial insertion movement of the curved end portion 2 along the outer surface of the edible portion of an egg in a skimming manner i.e. an axial advance for curved insertion results in large sections of the shell being separated, and in this way the egg shell can be easily and quickly loosened and removed.

The handle 3 is essential to provide a hold and it serves as a means for applying force and direction to the curved end portion 2.

The upper blade 4 provides a tongs-like or tweezer arrangement and is used to grip the sections of the loosened egg shell and to remove and dispose of the shell sections; it eliminates the need for finger contact of the shell sections.

The flexing of upper blade 4 can be attained by either providing a hinge (not shown) and spring arrangement 5, or by an extension of the handle 3 in a curve-around arrangement 6 in the case where the type of material used has the required "flexing" properties suitable for tweezer service.

The suitable materials of construction for this invention can be any solid or combination of solids that can be shaped and will retain their shape under the usage conditions described above.

The materials must stand-up to normal household cleaning procedures by means of detergent and water.

In order to ensure an adequate grip and to facilitate its use the overall length of the device should be approximately 6 inch and the width of the curved section should be approximately ¾ inch.

The same technique and principle can be applied to peeling a citrus fruit like an orange just by changing the contour and overall dimensions of the device.

The embodiments of the invention in which an exclusive property or privilege is claimed are defined as follows:

1. A tongs-like hand tool for use in removing a rupturable outer protective layer of a generally spherical object, such as the shell from a boiled egg, comprising a lower blade, an upper blade connected thereto and forming a handle portion adjacent the connection, said upper blade extending therefrom in at least partial overlapping relation with the lower blade, the lower blade having a curved outer end portion the surface thereof remote from the upper blade being contoured in downward concave, part-spherical relation to facilitate insertion of the lower blade in axial advancing separating relation between said outer layer and the remainder of said object, wherein the curved surface of the lower blade substantially conforms with the surface of the object, said upper blade being flexibly displaceable into gripping relation with said lower blade to secure a portion of said outer layer therebetween.

2. The tool as claimed in claim 1 wherein said lower blade end portion is bevelled to facilitate said axial insertion of the blade, and to provide cutting action thereto on axial movement beneath said outer layer.

3. The tool as claimed in claim 2 including coil spring means within said handle portion to maintain said upper blade and said lower blade in normally spaced-apart relation when not in a manually compressed condition.

* * * * *